US012646013B2

(12) United States Patent
Drayna et al.

(10) Patent No.: US 12,646,013 B2
(45) Date of Patent:         Jun. 2, 2026

(54) SYSTEMS AND METHODS FOR DETERMINING RIDEABLE VEHICLE LOCATIONS

(71) Applicant: Lyft, Inc., San Francisco, CA (US)

(72) Inventors: Garrett Korda Drayna, San Francisco, CA (US); Jatin Chopra, San Francisco, CA (US); Griffin Thomson, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 18/931,545

(22) Filed: Oct. 30, 2024

(65) Prior Publication Data

US 2025/0124361 A1      Apr. 17, 2025

Related U.S. Application Data

(63) Continuation of application No. 16/686,074, filed on Nov. 15, 2019, now Pat. No. 12,141,716.

(51) Int. Cl.
*G06Q 10/02*          (2012.01)
*G06Q 50/40*          (2024.01)
*H04W 4/029*          (2018.01)

(52) U.S. Cl.
CPC ............. *G06Q 10/02* (2013.01); *G06Q 50/40* (2024.01); *H04W 4/029* (2018.02)

(58) Field of Classification Search
CPC ........ G06Q 10/02; G06Q 50/40; H04W 4/029
See application file for complete search history.

(56) References Cited

U.S. PATENT DOCUMENTS

| | | | | |
|---|---|---|---|---|
| 9,788,163 | B2 * | 10/2017 | Haro ..................... | G01S 5/0284 |
| 2011/0307171 | A1 * | 12/2011 | Waite ..................... | G01C 21/30 |
| | | | | 701/421 |
| 2014/0244156 | A1 * | 8/2014 | Magnusson ............ | G01C 21/30 |
| | | | | 701/418 |
| 2018/0058856 | A1 * | 3/2018 | Catherall .............. | H04W 48/04 |

(Continued)

OTHER PUBLICATIONS

L. Xu, S. Zhang, J. Quan and X. Lin, "Vehicle Positioning Using Wi-Fi Networks and GPS/DR System," 2009 Fifth International Conference on Mobile Ad-hoc and Sensor Networks, Fujian, China, 2009, pp. 287-293 (Year: 2009) (Year: 2009).*

*Primary Examiner* — Jeff Zimmerman
*Assistant Examiner* — Wayne S. Murray
(74) *Attorney, Agent, or Firm* — Baker Botts L.L.P.

(57)          ABSTRACT
The disclosed computer-implemented method may include using location data from multiple devices improve the accuracy of location estimates for a rideable vehicle and/or provide calibration for location information. In some examples, at the end of a ride the system may record the location of the rider's device to augment the location data from the rideable vehicle. In another example, when a batch of rideable vehicles are delivered to a location, the system may use the location of the operator's device and/or the locations of other rideable vehicles in the batch to increase the accuracy of data for the location of any given rideable vehicle. In some embodiments, the system may detect the number of functioning location sensors to determine the confidence in the location of the vehicle. This confidence information can then be used in network decisions such as matching. Various other methods, systems, and computer-readable media are also disclosed.

19 Claims, 12 Drawing Sheets

(56) References Cited

U.S. PATENT DOCUMENTS

| | | | |
|---|---|---|---|
| 2018/0352376 A1* | 12/2018 | Shuman | G06F 16/29 |
| 2019/0360825 A1* | 11/2019 | Wang | G06Q 20/327 |
| 2019/0385452 A1* | 12/2019 | Nangeroni | G08G 1/202 |
| 2020/0210729 A1* | 7/2020 | Beaurepaire | G06V 10/44 |
| 2021/0070311 A1* | 3/2021 | Patychuk | B60W 50/035 |
| 2021/0116576 A1* | 4/2021 | Hillier | G01S 19/31 |

* cited by examiner

Reported
Location
706

Reported
Location
704

Rideable
Vehicle
702

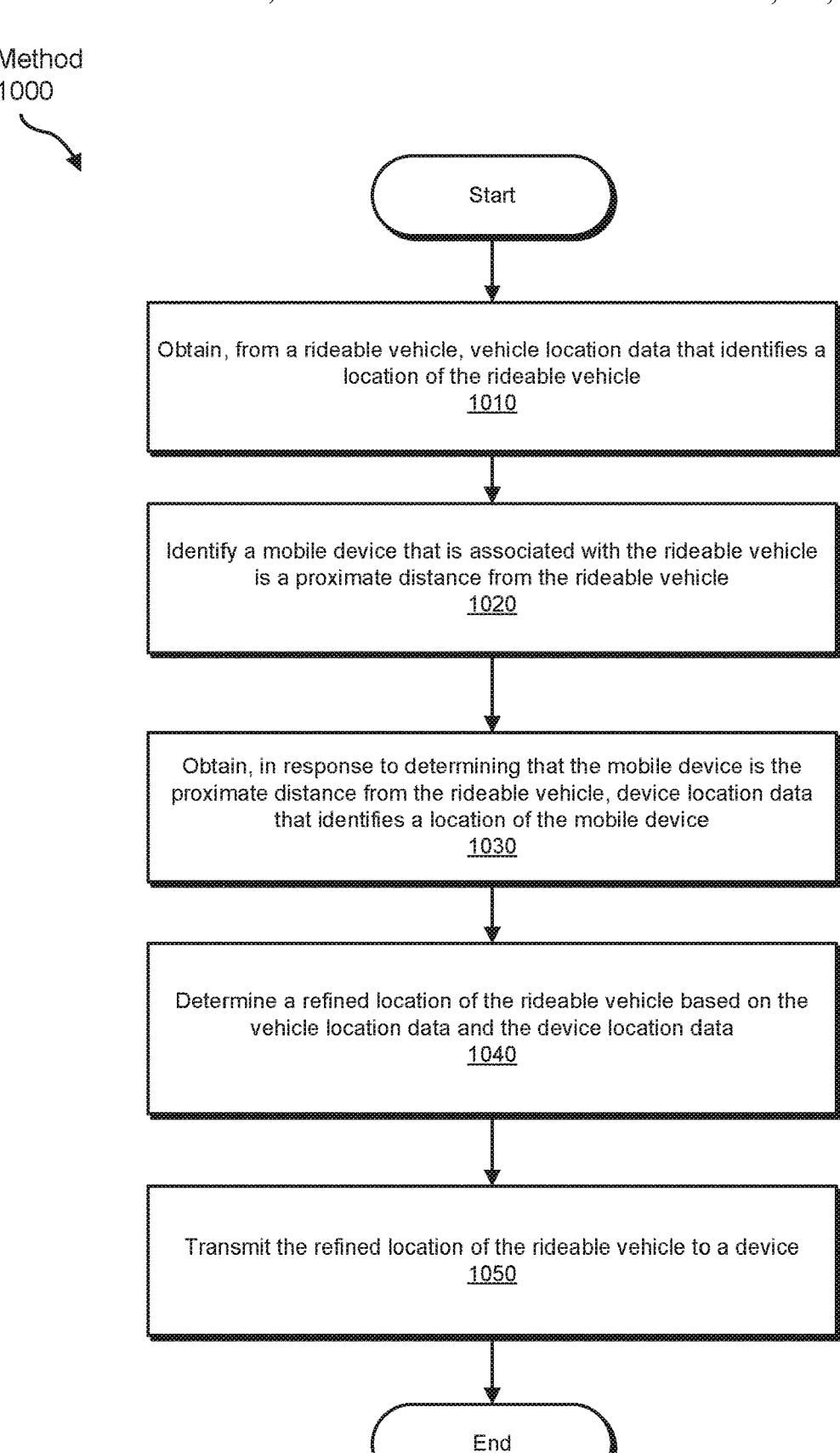

Method
1000

Start

Obtain, from a rideable vehicle, vehicle location data that identifies a location of the rideable vehicle
1010

Identify a mobile device that is associated with the rideable vehicle is a proximate distance from the rideable vehicle
1020

Obtain, in response to determining that the mobile device is the proximate distance from the rideable vehicle, device location data that identifies a location of the mobile device
1030

Determine a refined location of the rideable vehicle based on the vehicle location data and the device location data
1040

Transmit the refined location of the rideable vehicle to a device
1050

End

*FIG. 10*

SYSTEMS AND METHODS FOR DETERMINING RIDEABLE VEHICLE LOCATIONS

PRIORITY

This application is a continuation under 35 U.S.C. § 120 of U.S. patent application Ser. No. 16/686,074, filed 15 Nov. 2019, which is incorporated herein by reference.

BACKGROUND

Some transportation services may provide transportation on demand, drawing from a transportation supply pool to meet the needs of those requesting transportation as the needs arise. In many examples, dynamic transportation matching service may attempt to provide a transportation requestor with a route to their destination that is efficient in terms of time, cost, or other constraints for both the transportation requestor and the dynamic transportation network. In some cases, a quicker or more efficient route to a destination may involve areas such as sidewalks and bicycle lanes that are off-limits to traditional lane-bound vehicles, such as cars and trucks. In other cases, it may be more efficient for a transportation requestor to travel a short distance to meet a transportation provider. Including rideable vehicles in a dynamic transportation network may enable transportation requestors to complete portions of a journey more efficiently.

In some examples, a dynamic transportation matching system may provide directions and/or a map to inform a transportation requestor about the location of a rideable vehicle. Unfortunately, location data received from rideable vehicles, such as micro-mobility vehicles, may not be accurate, leading to inefficient matching and user frustration. Accordingly, improving the ability of a dynamic transportation matching system to determine locations for rideable vehicles may improve user experience and/or matching.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 10 is a flow diagram of an example method for determining rideable vehicle locations.

Figure 1:
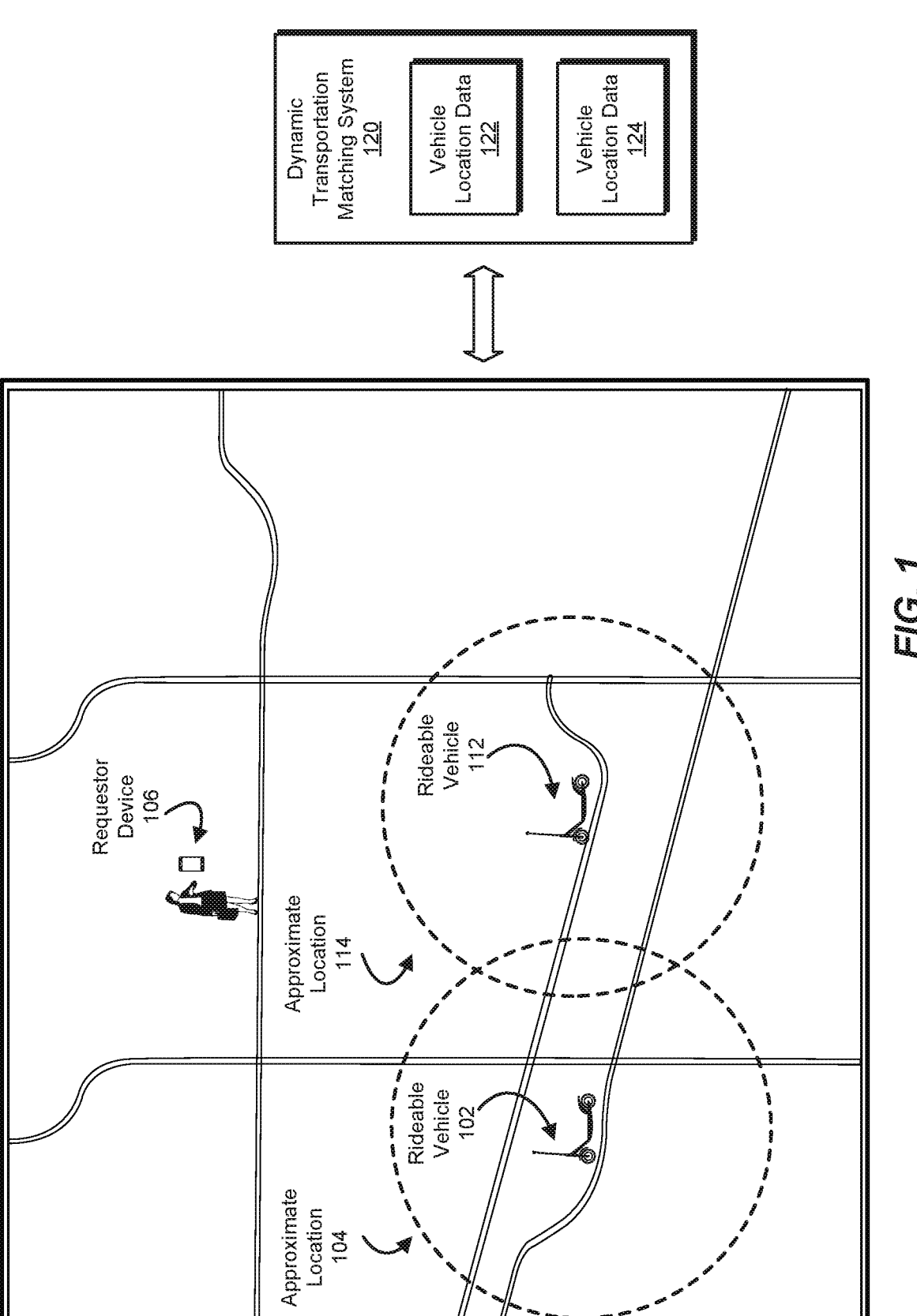
FIG. 1 is an illustration of example rideable vehicles with approximate locations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to using location data from multiple devices (e.g., a scooter and a mobile device, such as a phone) to improve the accuracy of location estimates for a rideable vehicle and/or to provide calibration for location information. In some examples, at the end of a ride the system may determine the location of the rider's mobile phone to compare with the location data taken directly from the rideable vehicle. In another example, when a batch of scooters are delivered to a location, the system may use the location of the operator's device and/or the locations of other scooters in the batch to increase the accuracy of data for the location of any given scooter. In some embodiments, the system may detect the number satellites detected by global positioning system (GPS) sensors to determine the confidence with which the device can register the location of the rideable vehicle. This confidence information can then be used in network decisions such as matching (e.g., preferentially matching a requestor to a rideable vehicle that can be located with greater certainty). By preferentially matching rideable vehicles with more accurate and/or confident locations, the systems described herein may improve the ability of a dynamic transportation matching system to match users with the closest and/or most convenient rideable vehicle. Additionally, the systems described herein may reduce user confusion by providing more accurate location information to users.

In addition to improving matching decisions and end-user experiences, the systems described herein may improve the efforts of operations teams that may be tasked with recovering and/or performing maintenance on rideable vehicles. For example, more accurate location data may help to reduce pickup time (e.g., the time measured from the arrival of an operations team to the nominal location of the rideable vehicle until the rideable vehicle is designated as with the operations team), pickup travel distance (e.g., the distance between the last observed location of the rideable vehicle and the location of the pick-up manually indicated by the operations team), and/or the rate at which an operations team successfully recovers rideable vehicles. In some examples, the systems described herein may also facilitate regulatory compliance by ensuring that rideable vehicles are in acceptable locations and/or may enable a dynamic transportation matching system to incentivize the placement of rideable vehicles in preferable locations.

In view of the above, as may be appreciated, the systems and methods described herein may improve the functioning of a computer that determines the location of rideable vehicles. Furthermore, for the reasons mentioned above and to be discussed in greater detail below, the systems and methods described herein may provide advantages to the field transportation and/or of dynamic transportation matching by improving matching involving rideable vehicles and/or providing more accurate rideable vehicle locations.

As will be explained in greater detail below, a dynamic transportation matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that operates within a dynamic transportation network (e.g., that is managed by, coordinated by, and/or drawn from the dynamic transportation matching system to provide transportation to transportation requestors).

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include lane-bound vehicles (e.g., cars, light trucks, etc.) that are primarily intended for operation on roads. Furthermore, the dynamic transportation network may include personal mobility vehicles (PMVs) and/or rideable vehicles (rideable vehicles) that are not bound to traditional road lanes, such as scooters, bicycles, electric scooters, electric bicycles, and/or any other suitable type of PMV and/or rideable vehicle. In some embodiments, a dynamic transportation network may include autonomous vehicles (e.g., self-driving cars) that may be capable of operating with little or no input from a human operator.

FIG. 1 illustrates example rideable vehicles with approximate locations. In some examples, a dynamic transportation matching system 120 may obtain vehicle location data 122 describing an approximate location 104 for a rideable vehicle 102 and/or vehicle location data 124 describing an approximate location 114 for a rideable vehicle 112. The systems described herein may obtain location data from rideable vehicles in a variety of ways. For example, the systems described herein may query the rideable vehicle for location data periodically (e.g., every minute, every half hour, every hour, etc.) and/or in response to particular events (de-reservation of a rideable vehicle, a nearby request for matching with a rideable vehicle, etc.). Additionally or alternatively, a rideable vehicle may send location data to dynamic transportation matching system 120 periodically and/or in response to particular events (reservation, de-reservation, locking, unlocking, etc.). The term "approximate location," in some examples, may refer to any location data (e.g., GPS coordinates, street address, etc.) that is expected to lack an acceptable level of precision and/or accuracy and/or about which there is uncertainty about the level of accuracy. For example, an approximate location may span an entire city block. In another example, an approximate location may be precise, but may be from a source known to be inaccurate (e.g., due to a previous record of proven inaccurate location information from that source) and/or may display indications of inaccuracy, such as fluctuating every few seconds or minutes even though the rideable vehicle has not moved during that time (e.g., according to a separate information source, such as a reservation system that indicates that the rideable vehicle is not currently in use). In some examples, an approximate location may be from a source with an unknown level of accuracy (e.g., a source that is sometimes accurate and sometimes inaccurate and/or a source without a known track record). The term "location," in some examples, may refer to any data that indicates a physical place including street address, GPS coordinates, relative address (e.g., in between two street addresses), and/or any other appropriate type of information.

In one example, dynamic transportation matching system 120 may receive a request for transportation from a requestor device 106. In some cases, dynamic transportation matching system 120 may factor the distance between requestor device 106 and the rideable vehicle into the matching decision about with which rideable vehicle to match requestor device 106. However, due to the imprecise nature of approximate locations 104 and 114, dynamic transportation matching system 120 may be unable to determine whether rideable vehicle 102 or rideable vehicle 112 is closer to requestor device 106. Additionally or alternatively, dynamic transportation matching system 120 may be unable to provide requestor device 106 with accurate location data about rideable vehicle 102 and/or rideable vehicle 112, decreasing the ability of the transportation requestor associated with requestor device 106 to locate the relevant rideable vehicle. By increasing the accuracy of and/or confidence in rideable vehicle location data, the systems described herein may improve matching efficiency and/or reduce user frustration.

Figure 2:
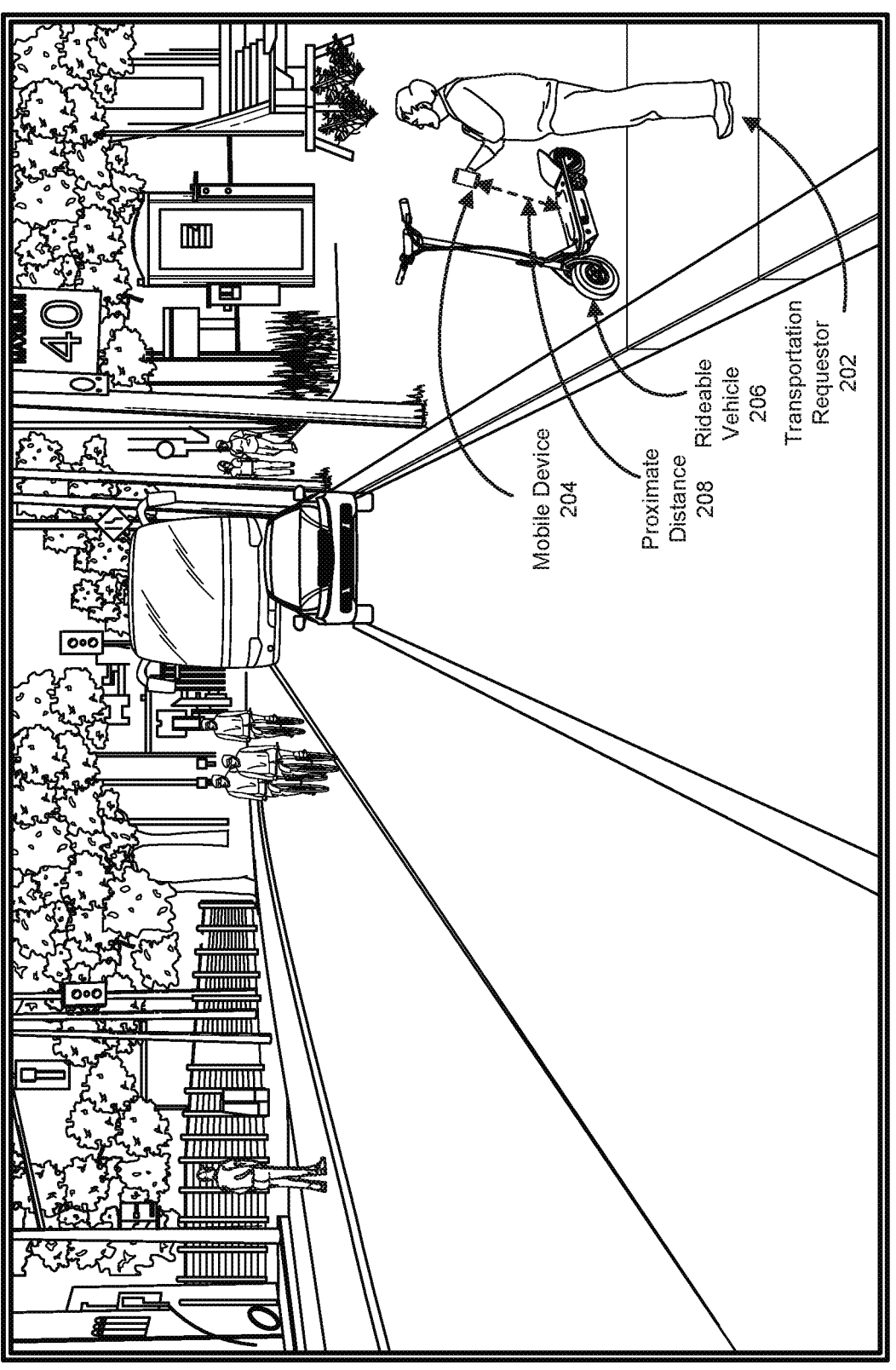
FIG. 2 is an illustration of an example rideable vehicle and requestor device.

FIG. 2 illustrates an example rideable vehicle and mobile device. In some examples, a transportation requestor 202 associated with a mobile device 204 may use a rideable vehicle 206 to complete a portion of a ride. At the end of the portion of the ride, mobile device 204 may send a message to the dynamic transportation matching system to indicate that the transportation requestor is no longer using rideable vehicle 206 and the dynamic transportation matching system may de-reserve rideable vehicle 206 from mobile device 204. In some embodiments, mobile device 204 may scan a QR code on rideable vehicle 206 to indicate a request for reservation of rideable vehicle 206 to mobile device 204, and/or a request for a release of a-reservation of rideable vehicle 206 from mobile device 204. The term "reservation," in some examples, may refer to a reservation of a rideable vehicle by a mobile device such that the rideable vehicle cannot be reserved and/or unlocked by any other mobile device while reserved. In some examples, a rideable vehicle may be reserved by designating (e.g., by the dynamic transportation matching system) the rideable vehicle for use by the user of a particular mobile device. In some embodiments, reservation and release of reservation (i.e., the end of the ride) of a rideable vehicle may correspond to physical locking and unlocking of the rideable vehicle. Additionally or alternatively, a rideable vehicle may be capable of being locked without ending the ride and/or reservation (e.g., while the transportation requestor runs into a coffee shop). The terms "release of reservation," "end of reservation," and/or "end of ride," in some examples, may refer to the removal and/or undoing of a reservation of a rideable vehicle. For example, a rideable vehicle may be released of a reservation by removing the association between a mobile device and the rideable vehicle, enabling other mobile devices to reserve, unlock, and/or access the rideable vehicle. Because the release of reservation request message may be sent at the end of the ride, the dynamic transportation matching system may determine, based on the message, that mobile device 204 is within a proximate distance 208 from rideable vehicle 206 at the time of the message.

The systems described herein may detect various different types of actions that indicate that a mobile device is within a proximate distance from a rideable vehicle, including an end of reservation request message from the mobile device, a reservation request message, a relocation confirmation message (e.g., from an operator device), and/or any other suitable type of action. The systems described herein may retrieve location data in connection with the end of ride of a rideable vehicle in any of a variety of ways. For example, the systems described herein may retrieve the drop-off location as determined by a rideable vehicle reservation application on a user device. Additionally or alternatively, the systems described herein may identify a sequence of locations registered by the rideable vehicle reservation application during an end of ride process. In some examples, as discussed earlier, the systems described herein may determine the location of the user device during a QR code scan performed by the user device on a QR code displayed on the rideable vehicle (e.g., as part of an end of ride and/or release of reservation process).

The term "proximate distance," in some examples, may generally refer to a distance that is below a threshold for distance, either fixed (e.g., one hundred feet, fifty feet, ten feet, etc.) or based on an objective metric (e.g., the range of a type of transmitter, the area covered by a wi-fi network, the area covered by a physical address, etc.). In some examples, two or more objects (e.g., devices and/or vehicles) within a proximate distance may be in the same physical location (e.g., street address and/or GPS coordinates). In some examples, two or more objects that are a within a proximate distance may be within several (e.g., two, three, four, or five) feet of one another. For example, a rideable device may be configured such that a requestor device must be within two or three feet for a transportation requestor to start and/or end a ride. Additionally or alternatively, a proximate distance may describe a general area (e.g., park, building, parking lot, and/or other location). In some examples, a proximate distance may describe the distance over which a wireless communications system (e.g., wi-fi, near field communication (NFC), radio-frequency identification (RFID), Bluetooth, etc.) may be capable of communicating (e.g., a wireless communication system used by a requestor device and/or a rideable device). In one example, a proximate distance may describe the range at which a scanner can read and/or identify an object, such as a QR code reader, a camera, and/or radio-frequency identification scanner.

The dynamic transportation matching system may determine that mobile device 204 is associated with rideable vehicle 206 in a variety of ways. For example, the dynamic transportation matching system may determine that rideable vehicle 206 is reserved to mobile device 204. In another example, the dynamic transportation matching system may determine that a mobile device is an operator device to which instructions have been sent (e.g., by the dynamic transportation matching system) to relocate a rideable vehicle. In some examples, the systems described herein may transmit the refined location to a device. In one example, the systems described herein may transmit the refined location with instructions to display the refined location on a map on a mobile device associated with a transportation requestor (e.g., if the requestor is matched with and/or looking for a rideable vehicle). For example, the systems described herein may transmit instructions that cause a map of the area around the refined location to be displayed on the mobile device along with an icon on the map that represents the refined location of the mobile device. Additionally or alternatively, the systems described herein may transmit the refined location to a mobile device associated with an operator to enable the operator to check, perform maintenance on, and/or pick up the rideable vehicle. In some embodiments, the systems described herein may transmit the refined location via Internet, text message, and/or any other suitable type of transmission medium and/or communication protocol.

Figure 3:
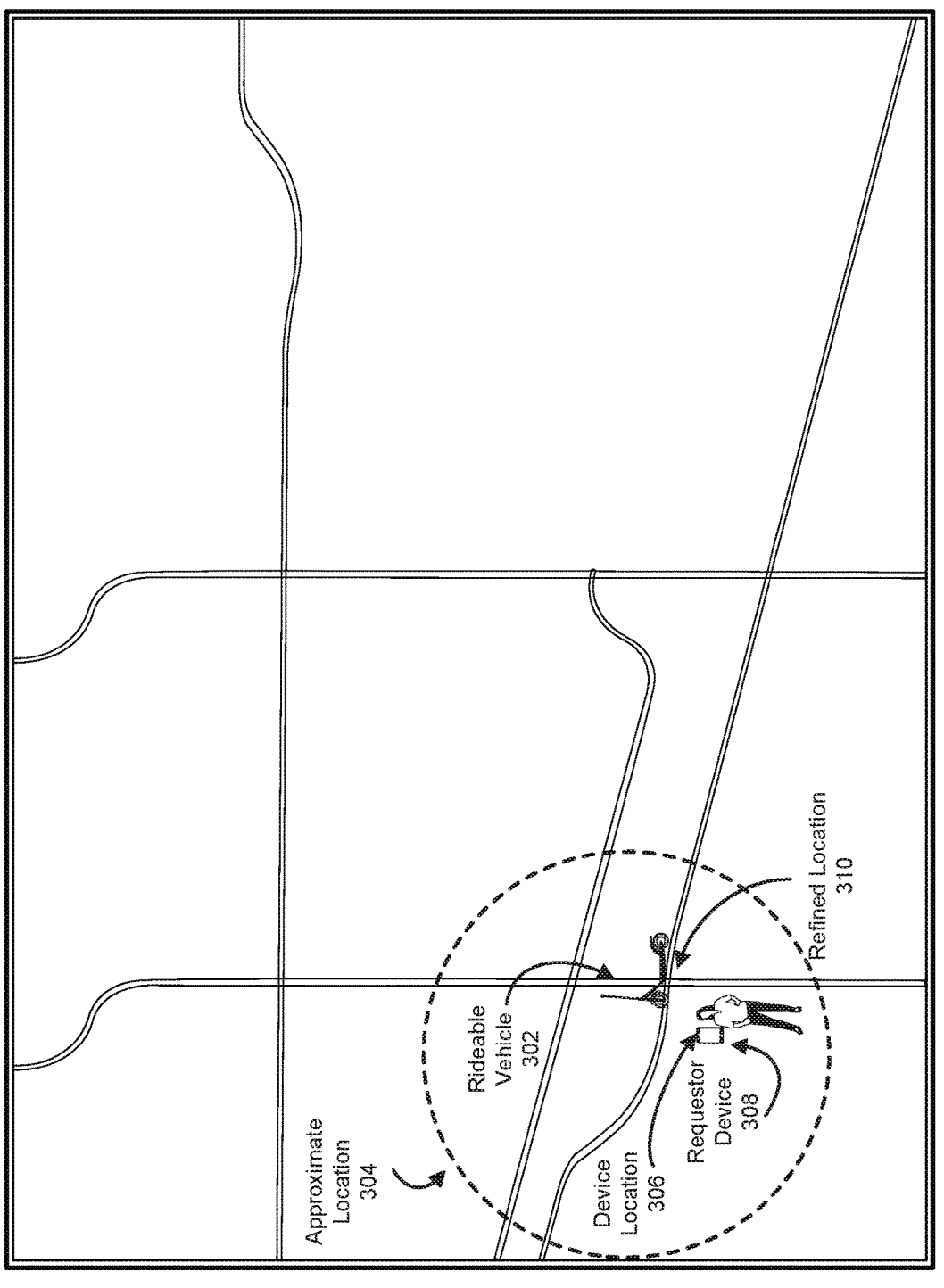
FIG. 3 is an overhead view of an example rideable vehicle and requestor device.

In some examples, the message from the mobile device to the dynamic transportation matching system that indicates the end of the portion of the ride may include device location data. For example, as illustrated in FIG. 3, a requestor device 308 (e.g., a mobile device associated with a transportation requestor) may send location data that describes a device location 306 and/or, in response to the message, the dynamic transportation matching system may request device location 306 from requestor device 308. In some examples, requestor device 308 may send location data even in situations where rideable vehicle 302 is not reporting data. For example, requestor device 308 may scan a QR code on rideable vehicle 302 while rideable vehicle 302 is inoperable (e.g., due to a drained battery).

In some examples, the dynamic transportation matching system may receive multiple messages containing device location 306 from requestor device 308 over time (e.g., during a ride) and may use previous reported instances of device location 306 in concert with the most recent instance of device location data 306 to estimate the actual current location of rideable vehicle 302. For example, the systems described herein may process multiple instances of device location data 306 using a map-match algorithm, a Kalman filter algorithm and/or a particle filter algorithm. In some examples, the systems described herein may use dead reckoning to determine the location of a rideable vehicle. For example, if a rideable vehicle has stopped sending location data (e.g., due to being in an area without signal), the systems described herein may use past location data from the rideable vehicle and the last known speed and/or direction of the rideable vehicle to estimate the current location of the rideable vehicle. In one embodiment, the dynamic transportation matching system may compare device location 306 with an approximate location 304 obtained from a rideable vehicle 302 associated with requestor device 308 to calculate a refined location 310 for rideable vehicle 302 that is more accurate and/or precise than approximate location 304. For example, the dynamic transportation matching system may triangulate multiple types of location data to arrive at refined location 310, may determine refined location 310 based primarily or entirely on location data from a sensor of a preferred type (e.g., with a history of accuracy), and/or may compare device location 306 with approximate location 304 in any other suitable way to determine refined location 310.

In some examples, the systems described herein may average and/or smooth multiple recent historical locations of the rideable vehicle (e.g., when the rideable vehicle is presumed to have remained in the same location) to estimate the current location of the rideable vehicle. Furthermore, the systems described herein may use odometer data to determine whether the rideable vehicle has actually moved. If the rideable vehicle has not actually moved, any apparent discrepancies between recent historical locations of the rideable vehicle may be attributed to "jitter" in the historical data due to location sensor error. By determining the degree of variance in the reported location of the rideable vehicle (the degree of the "jitter"), the systems described herein may determine a degree of confidence in refined location 310 of the rideable vehicle.

The term "refined location," in some examples, may refer to any location that is expected to have a high degree of accuracy, precision, and/or reliability in comparison to a location calculated using fewer and/or different data points. For example, a location calculated using sparse data may have a low level of precision such that the location spans a city block, multiple addresses, and/or a quarter-mile radius while a refined location may have a higher degree of precision such as a single street address and/or an area with a ten meter radius. In another example, an initially reported and/or calculated location may be inaccurate by reporting a location twenty meters away from the actual location of the rideable vehicle while a refined location may be more accurate and may report a location within five meters of the actual location. In some embodiments, the dynamic transportation matching system may discard approximate location 304 and may use device location 306 directly. Additionally or alternatively, the dynamic transportation matching system may assign weights to device location 306 and approximate location 304 and perform calculations to arrive at refined location 310. In some embodiments, requestor device 308 may be equipped with one or more location sensors that are preferred over the location sensor of rideable vehicle 302. For example, the location sensor or sensors of requestor device 308 may be preferred due to being more precise, accurate, and/or reliable than the location sensor or sensors of rideable vehicle 302. In some embodiments, a preferred location sensor may be ranked higher on an ordered list of reliable location sensors. Consequently, in some examples the dynamic transportation matching system may assign a higher weight to device location 306 than to approximate location 304 when determining refined location 310. In some embodiments, the systems described herein may store and/or access an ordered list of types of location sensors in order of preference. Additionally or alternatively, the systems described herein may track the accuracy and/or precision of location sensor data from various types of sensors over time and may dynamically adjust sensor preferences in response to determining the level of accuracy and/or precision provided by different types of sensors.

In some examples, the term "location sensor," as used herein, may generally refer to any hardware and/or software component that is capable of determining a location of a device and/or vehicle. For example, a location sensor may be a GPS sensor, a wi-fi receiver, a simultaneous localization and mapping system (SLAM), a camera-based localization engine, a beacon, a multipath indicator, and/or any other type of suitable sensor. In some examples, the systems described herein may use an odometer and/or altimeter as a location sensor (e.g., by determining that a rideable vehicle has not moved despite reporting modified location data because the odometer has not increased and/or the altimeter reading has not changed). In some embodiments, a location sensor may be part of and/or attached to a rideable vehicle. Additionally or alternatively, a location sensor may be part of and/or attached to an additional device, such as a mobile device, wearable device, and/or any other suitable type of device. In some embodiments, a location sensor may be part of an additional device associated with the owner of a mobile device to which the rideable vehicle is reserved (e.g., a smart watch worn by the owner of the mobile device). In one embodiment, a location sensor may be associated with an automobile that travels through areas with poor signal (e.g., poor GPS signal, minimal wi-fi networks, and/or poor cellular reception) to determine the locations of scooters. In some examples, the term "sensor data," as used herein, may refer to any data received from a location sensor. In some embodiments, the systems described herein may receive sensor data in various formats, such as GPS coordinates, a street address, a relative location (e.g., to a landmark and/or other device), a broad location (e.g., a city block, a park, etc.), visual data (e.g., an image of a street sign), and/or any other suitable format. In one example, sensor data from a wi-fi receiver may include the identifiers of one or more networks currently visible to the wi-fi receiver, enabling the systems described herein to triangulate the location of the wi-fi receiver based on stored coverage maps of known wi-fi networks. In some examples, the dynamic transportation matching system may immediately (i.e., as soon as the data is received) use device location 306 to determine refined location 310 for rideable vehicle 302. Additionally or alternatively, the dynamic transportation matching system may store device location 306 and may later use device location 306 to determine refined location 310 for rideable vehicle 302.

In some embodiments, the systems described herein may retrieve device location 306 in response to determining that location data obtained from rideable vehicle 302 is insufficiently reliable (e.g., does not meet a threshold for reliability, accuracy, and/or precision). For example, a wi-fi sensor of rideable vehicle 302 may report a different location than a GPS sensor of rideable vehicle 302. In some embodiments, the systems described herein may determine that approximate location 304 is inaccurate based on the difference between the location reported by the GPS sensor and the location reported by the wi-fi sensor. In one example, the location of rideable vehicle 302 reported by the wi-fi sensor may not match the location of rideable vehicle 302 reported by the GPS sensor, prompting the systems described herein to retrieve device location 306 in order to calculate refined location 310 of rideable vehicle 302. In some embodiments, the systems described herein may determine that two reported locations do not match if the reported locations do not resolve to the same street address. Additionally or alternatively, two reported locations may not match if the distance between the locations exceeds a threshold for matching locations. For example, two reported locations may not match if the locations are more than five feet apart, more than ten feet apart, more than twenty feet apart, or more than fifty feet apart.

In some embodiments, the systems described herein may use map data to calculate refined location 310. For example, the location obtained from rideable vehicle 302 may correspond to a location on the map where rideable vehicle 302 could not plausibly be, such as inside a locked building. In some embodiments, the systems described herein may determine that the rideable vehicle is not located at the implausible map location but instead somewhere nearby, such as the sidewalk in front of the building. The term "implausible map location," in some examples, may generally refer to any map location where it is implausible and/or unlikely for a rideable vehicle to be located. In some embodiments, the systems described herein may define an implausible map location based on one or more characteristics, such as time of day, day of week, building accessibility, and/or type of building (e.g., public, commercial, government, residential, etc.). In one embodiment, implausible map locations and/or characteristics of implausible map locations may be manually identified. In some examples, a map location may only be an implausible map location at certain times of the day, such as when a business is closed, rendering the building inaccessible to the public. In one example, while it is possible that a rideable vehicle was placed inside a locked building by a person with access to the building, it is more plausible that the rideable vehicle was left on the sidewalk outside the building and the reported location data indicating that the rideable vehicle is inside the building is inaccurate. The systems described herein may use any suitable database, digital map data source, and/or query system to identify implausible locations.

Figure 4:
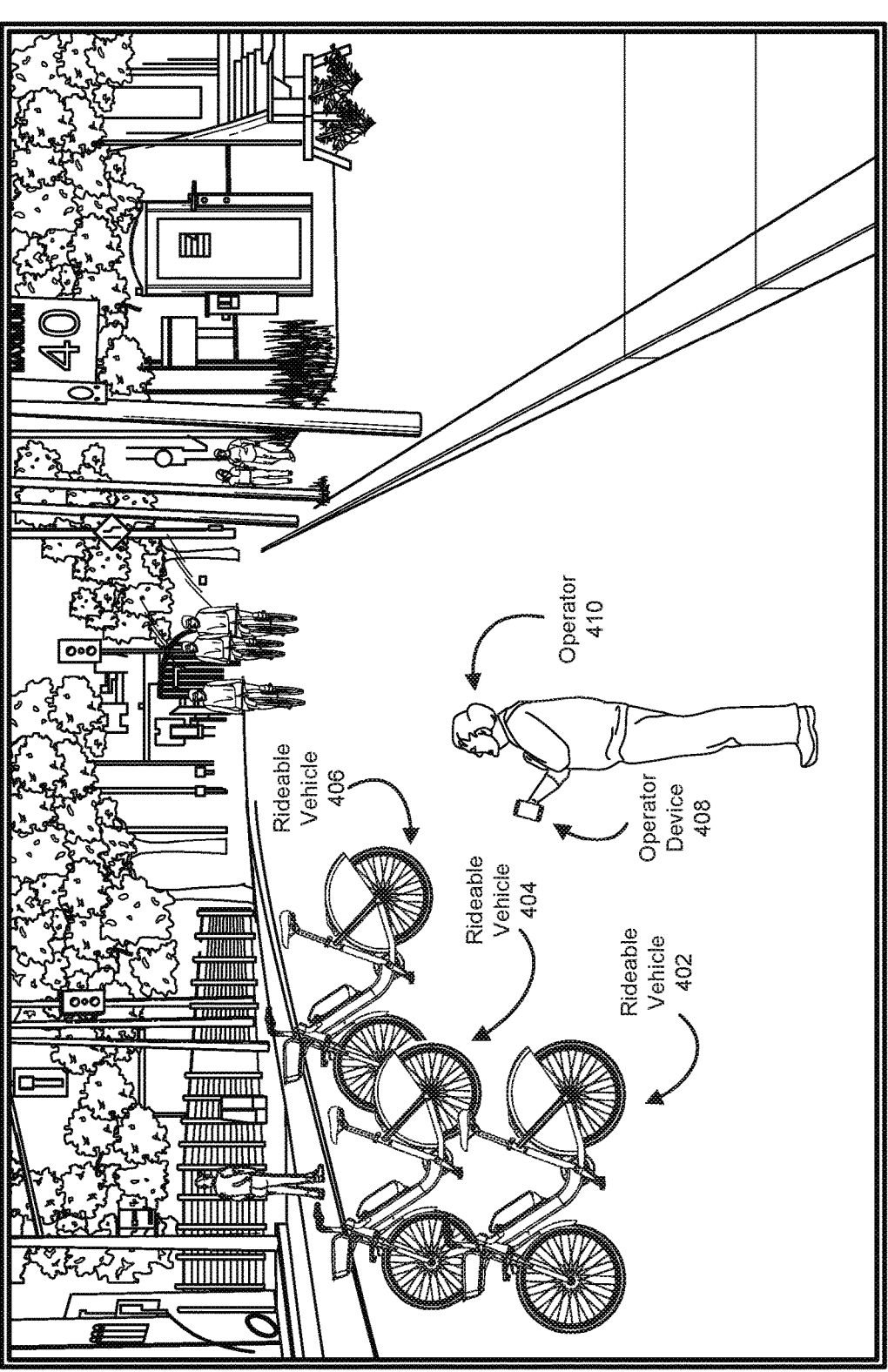
FIG. 4 is an illustration of example rideable vehicles and an operator device.

FIG. 4 illustrates example rideable vehicles and an operator device. In some examples, an operator 410 associated with an operator device 408 (e.g., a mobile device associated with an operator) may relocate one or more rideable vehicles between one location and another. For example, operator 410 may pick up rideable vehicles at a maintenance facility and drop off rideable vehicles at an accessible location. In one example, the operator 410 may relocate rideable vehicles 402, 404, and/or 406 to the same location (i.e., such that operator device 408 and rideable vehicles 402, 404, and/or 406 are proximate). In some examples, when operator 410 drops off the rideable vehicles, operator device 408 may send a message to the dynamic transportation matching system indicating that the rideable vehicles are in place. This message may indicate to the dynamic transportation matching system that operator device 408 is within a proximate distance from rideable vehicles 402, 404, and/or 406 and/or that rideable vehicles 402, 404, and/or 406 are proximate to one another. In some embodiments, this message may include location data that describes the current location of operator device 408. Additionally or alternatively, the dynamic transportation matching system may request, in response to receiving the message, device location data from operator device 408. In some examples, the dynamic transportation matching system may use location data from operator device 408 to determine a refined location for rideable vehicles 402, 404, and/or 406. In some embodiments, when operator 410 initially picks up rideable vehicles 402, 404, and/or 406, the systems described herein may receive a message from operator device 408 indicating that rideable vehicle 402, 404, and/or 406 has been picked up and may compare location data in this message with a location previously determined for rideable vehicle 402, 404, and/or 406 and/or may compare a timestamp of operator device 408 arriving at the previously determined location for rideable vehicles 402, 404, and/or 406 with a timestamp of the message (e.g., because a longer gap between timestamps may indicate a less accurate previously determined location) to determine the accuracy of the previous location data (e.g., in order to correct for systemic and/or predictable inaccuracy in the future). In one example, the systems described herein may use rideable recovery rates to assess the accuracy of previously recorded location data (e.g., if an operator cannot find a rideable, the stored location may be inaccurate). Additionally or alternatively, the dynamic transportation matching system may obtain location data from rideable vehicles 402 and/or 404 to determine a refined location for rideable vehicle 406, location data from rideable vehicles 402 and 406 to determine a refined location for rideable vehicle 404, and/or location data from rideable vehicles 404 and 406 to determine a refined location for rideable vehicle 402.

Figure 5:
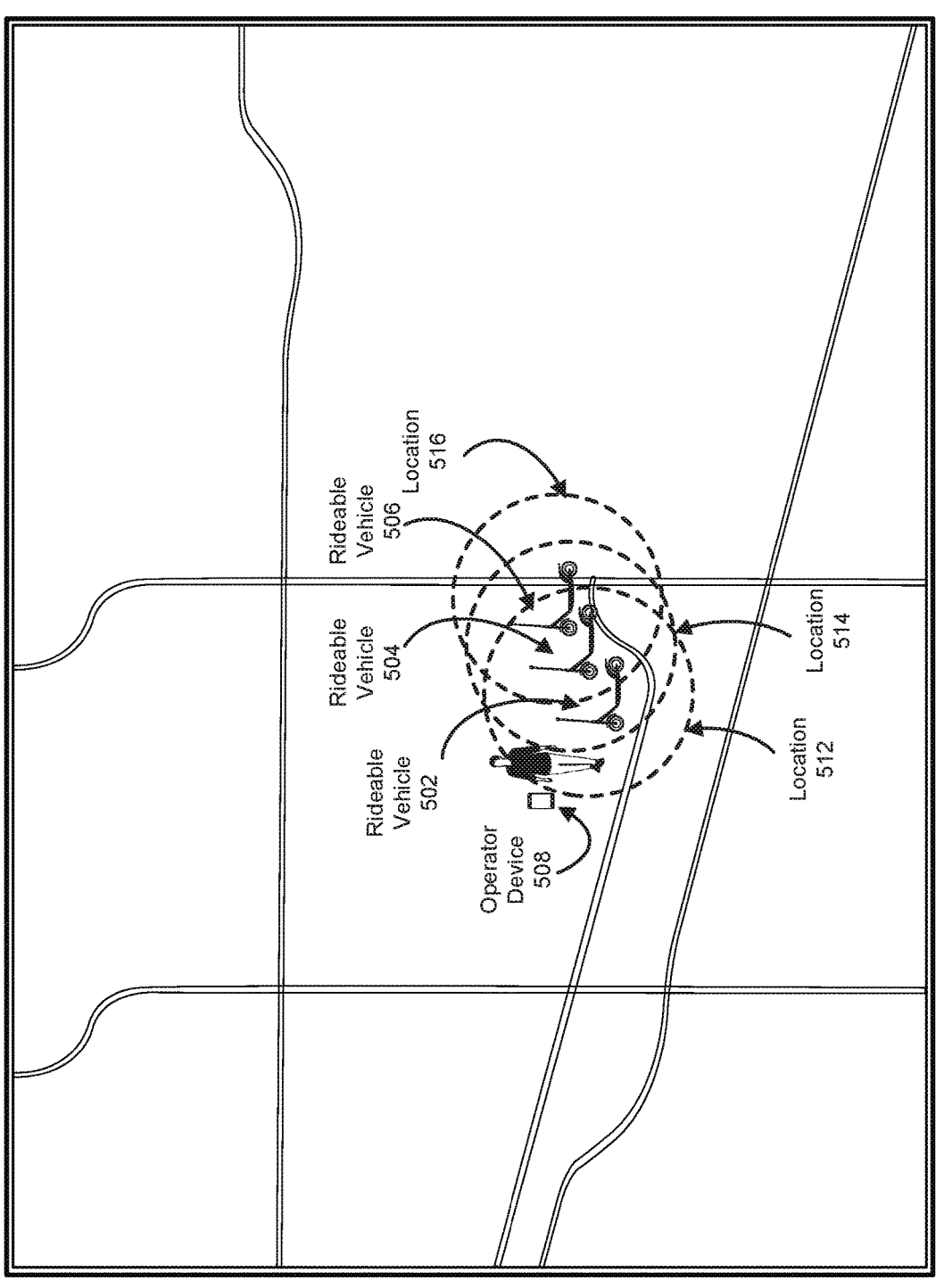
FIG. 5 is an illustration of example rideable vehicles and an operator device.

In some examples, the dynamic transportation matching system may use location data for any and/or all rideable vehicles in a group of proximate rideable vehicles to refine the location of any and/or each rideable vehicle in the group. For example, as illustrated in FIG. 5, an operator associated with an operator device 508 may relocate rideable vehicles 502, 504, and/or 506 such that rideable vehicles 502, 504, and/or 506 are within a proximate distance from one another. In one example, the dynamic transportation matching system may obtain a location 512 from rideable vehicle 502, a location 514 from rideable vehicle 504, and/or a location 516 from rideable vehicle 506. In some embodiments, the dynamic transportation matching system may use location data from additional rideable vehicles and/or operator device 508 to determine a refined location for a given rideable vehicle. For example, the dynamic transportation matching system may use location data from operator device 508, rideable vehicle 506, and/or rideable vehicle 504 to determine a refined location of rideable vehicle 502. In some embodiments, the dynamic transportation matching system may triangulate the location of a rideable vehicle based on location data from additional rideable vehicles. Additionally or alternatively, the dynamic transportation matching system may average the reported location of a group of rideable vehicles to determine a refined location for one or more rideable vehicles in the group. In some embodiments, the dynamic transportation matching system may compare historical location accuracy data for multiple rideable vehicles in a group and may use location data reported by the rideable vehicle with the highest historical location accuracy to determine a refined location for one or more other rideable vehicles in the group.

Figure 6:
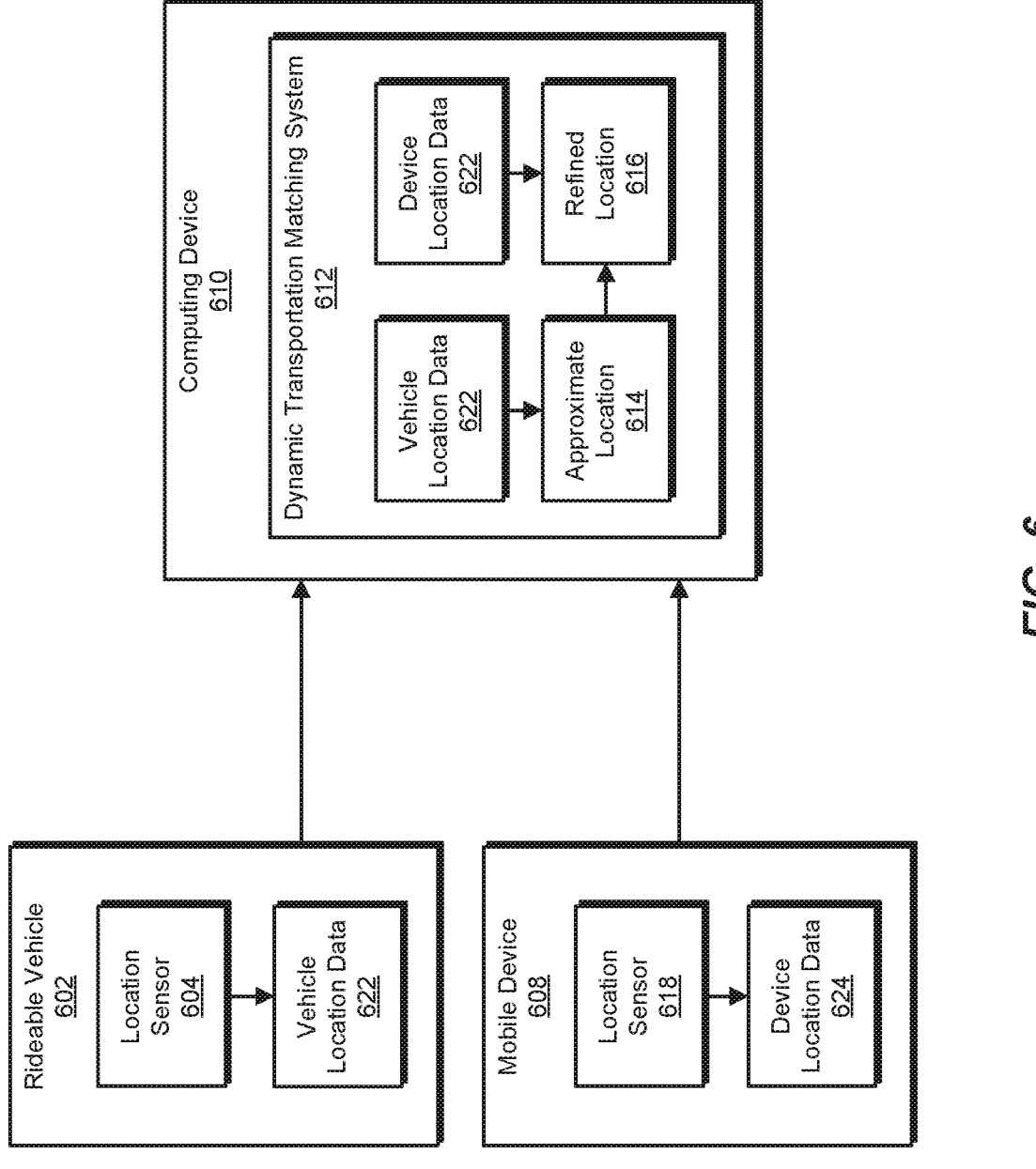
FIG. 6 is a block diagram of an example system for determining rideable vehicle locations.

FIG. 6 illustrates an example block system for determining rideable vehicle locations. In some embodiments, as illustrated in FIG. 6, a dynamic transportation matching system 612 hosted on a computing device 610 may obtain vehicle location data 622 from a location sensor 604 of a rideable vehicle 602 and/or device location data 624 from a location sensor 618 of a mobile device 608. In some embodiments, computing device 610 may represent a personal computing device, a server, and/or one or more physical and/or virtual (e.g., cloud) servers. In one example, dynamic transportation matching system 612 may use vehicle location data 622 to determine an approximate location 614 of rideable vehicle 602. In some examples, dynamic transportation matching system may determine that mobile device 608 is associated with rideable vehicle 602 and is within a proximate distance from rideable vehicle 602. The term "associated with," in some examples, may refer to a mobile device that is matched with a rideable vehicle, an operator device assigned to relocate the rideable vehicle, a mobile device that obtains access or permission to use the rideable vehicle, a mobile device that scans a QR code on the rideable vehicle, a mobile device that ends a ride with the rideable vehicle, and/or any other suitable association between a mobile device an a rideable vehicle that is associated with a dynamic transportation network. Dynamic transportation matching system may use device location data 624 in place of or in conjunction with approximate location 614 and/or vehicle location data 622 to determine a refined location 616 that is more accurate and/or more precise than approximate location 614. For example, approximate location 614 may span a city block and refined location 616 may be a single street address. In another example, approximate location 614 may be a set of GPS coordinates and refined location 616 may be a different set of GPS coordinates of similar precision but higher accuracy. In one example, refined location 616 may refer to a landmark, such as, "in front of the coffee shop."

Figure 7:
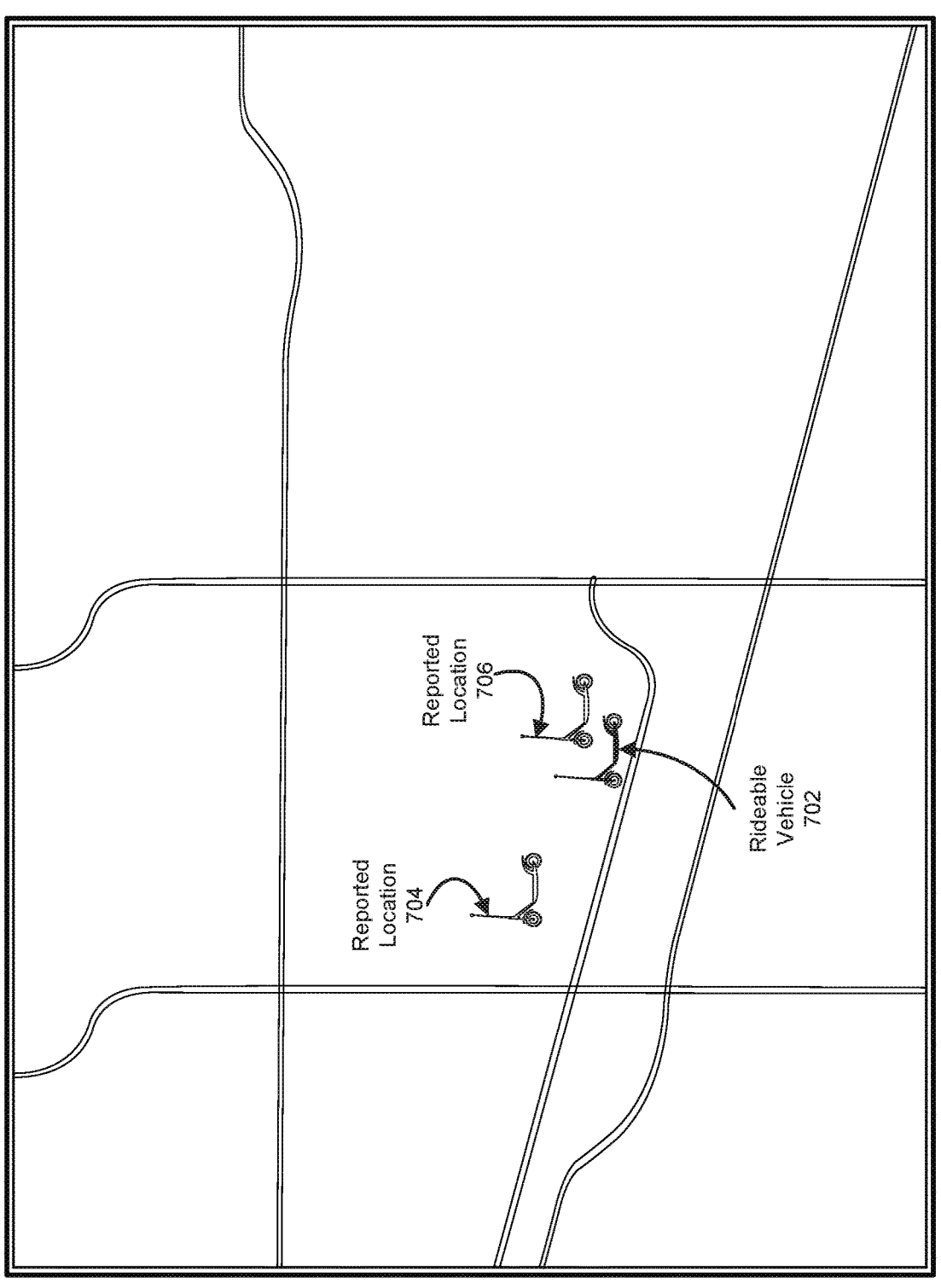
FIG. 7 is an illustration of example reported locations of a rideable vehicle.

FIG. 7 illustrates example reported locations of a rideable vehicle. As illustrated in FIG. 7, in some examples, the dynamic transportation matching system may obtain a reported location 704 of a rideable vehicle 702 from one location sensor and a different reported location 706 of rideable vehicle 702 from a different location sensor. In some examples, one or both location sensors may be part of rideable vehicle 702. Additionally or alternatively, one or both location sensors may not be part of rideable vehicle 702 but may be part of another device (e.g., a mobile device, a wearable device of a transportation requestor, a nearby rideable vehicle, a dock, etc.). In some examples, the dynamic transportation matching system may obtain location data from multiple sensors of multiple types on and/or around the rideable vehicle. In some embodiments, the systems described herein may calculate a level of location confidence in a determined location of rideable vehicle 702 based at least in part on the discrepancy between reported location 704 and reported location 706 (e.g., the distance between reported location 704 and location 706). In some embodiments, the systems described herein may perform a comparison of location data from multiple sensors of different types. For example, the systems described herein may compare a location reported by one location sensor of a rideable vehicle (e.g., a GPS sensor) with another sensor and/or type of sensor of the rideable vehicle (e.g., a wi-fi sensor, a SLAM sensor, etc.) to determine whether the different sensors are reporting the same location or different locations. In some embodiments, the systems described herein may compare a location sensor of the rideable vehicle with a location sensor of another device, such as an additional rideable vehicle, a mobile device, a wearable device, a rideable vehicle dock, and/or any other type of device. In some embodiments, the systems described herein may compare location data reported by the rideable vehicle, a mobile device to which the rideable vehicle is reserved, and an additional device associated with the owner of the mobile device (e.g., a wearable device, a secondary mobile device, etc.). In some examples, the higher the similarity of the reported locations gathered from different sensors, the higher the level of location confidence. In various embodiments, the level of location confidence may be expressed as a numerical score, a percentage, a category, and/or any combination of the above. For example, a rideable vehicle that is being reported as at the same street address by all sensors may have a level of location confidence of 9.9, 100%, or "high." In another example, a rideable vehicle that is reported as being at slightly different locations (e.g., adjacent street addresses) by different sensors may have a lower level of location confidence. Additionally or alternatively, the systems described herein may calculate a level of location confidence based at least in part on a total number and/or percentage of location sensors associated with the rideable vehicle that are functioning (e.g., that are currently reporting data). For example, if a rideable vehicle is associated with four GPS sensors (e.g., equipped on the rideable vehicle and/or nearby devices) and only three of the sensors are reporting data (i.e., 75%), the systems described herein may have a lower level of location confidence in the location of the rideable vehicle than if all four sensors were reporting data (i.e., 100%). In some embodiments, a rideable vehicle may be equipped with a single GPS device that is capable of receiving data from multiple satellites and that may identify and/or report how many satellites are currently reporting data. In some examples, the systems described herein may use the number of satellites registered by the GPS sensor to calculate the level of location confidence in the location of the rideable vehicle (e.g., by calculating a higher level of location confidence if more satellites are detected by the GPS sensor). Additionally or alternatively, a rideable vehicle may be equipped with multiple independent location devices and/or components and the systems described herein may identify which location sensors are currently reporting data. In some embodiments, the systems described herein may determine that a sensor is not functional because the sensor is not reporting data. Additionally or alternatively, the systems described herein may receive an error message from the sensor. In some examples, the systems described herein may have a higher level of location confidence in the location of a rideable vehicle that is reporting data and has corroborating data from another device (e.g., a mobile device) than a rideable vehicle without corroborating data.

Figure 8:
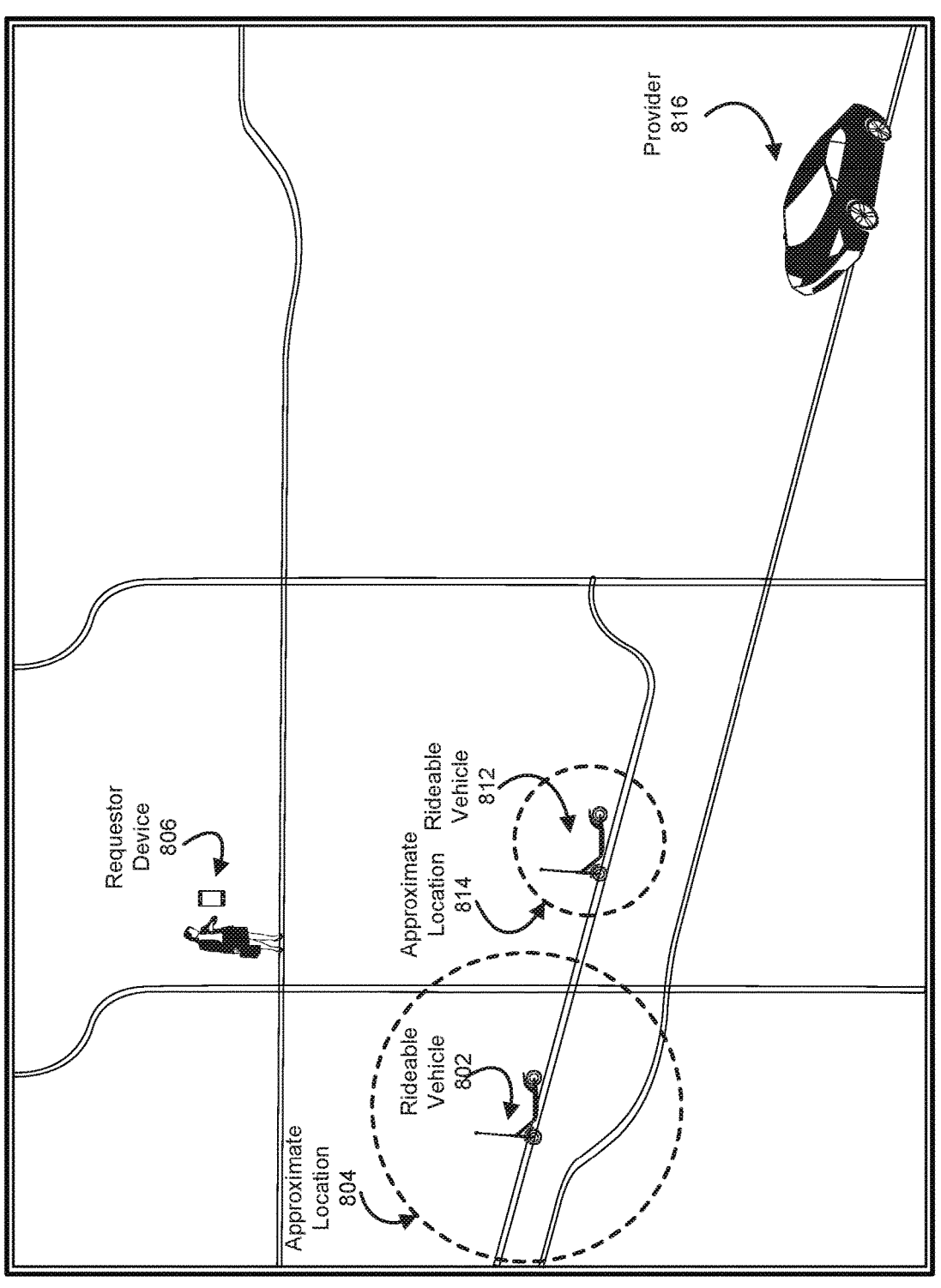
FIG. 8 is an illustration of example rideable vehicles with varying location confidence.

FIG. 8 illustrates example rideable vehicles with varying location confidence levels. In some examples, the dynamic transportation matching system may preferentially match a requestor device with a rideable vehicle that the systems described herein have a higher level of location confidence in the location of than a rideable vehicle that the systems described herein have a lower level of location confidence in the location of. For example, the dynamic transportation matching system may receive a request for transportation from a requestor device 806. In one example, a rideable vehicle 802 may have an approximate location 804 with a low level of location confidence and/or precision while a rideable vehicle 812 may have an approximate location 814 with a higher level of location confidence and/or precision. In some examples, the dynamic transportation matching system may match requestor device 806 with rideable vehicle 812 even though rideable vehicle 802 is likely to be closer to requestor device 806. In one example, the dynamic transportation matching system may send a message to requestor device 806 that includes a refined location of rideable vehicle 812 in order to aid the transportation requestor in locating rideable vehicle 812. In some examples, the higher level of precision and/or accuracy (which may be expressed as a higher level of location confidence) of the location of rideable vehicle 812 may enable the transportation requestor to locate rideable vehicle 812 more quickly, decreasing frustration and improving efficiency.

In some cases, the efficiency and/or predictability with which the transportation requestor locates the rideable vehicle may affect other parts of the transportation network. For example, requestor device 806 may be matched with a provider 816 for one leg of the ride and the transportation requestor may be prompted to use rideable vehicle 812 to meet provider 816. The more efficiently and predictably the transportation requestor locates and begins riding rideable vehicle 812, the more efficiently the dynamic transportation matching system can coordinate the meeting with provider 816, which may reduce ride time and increase both provider and requestor satisfaction.

Figure 9:
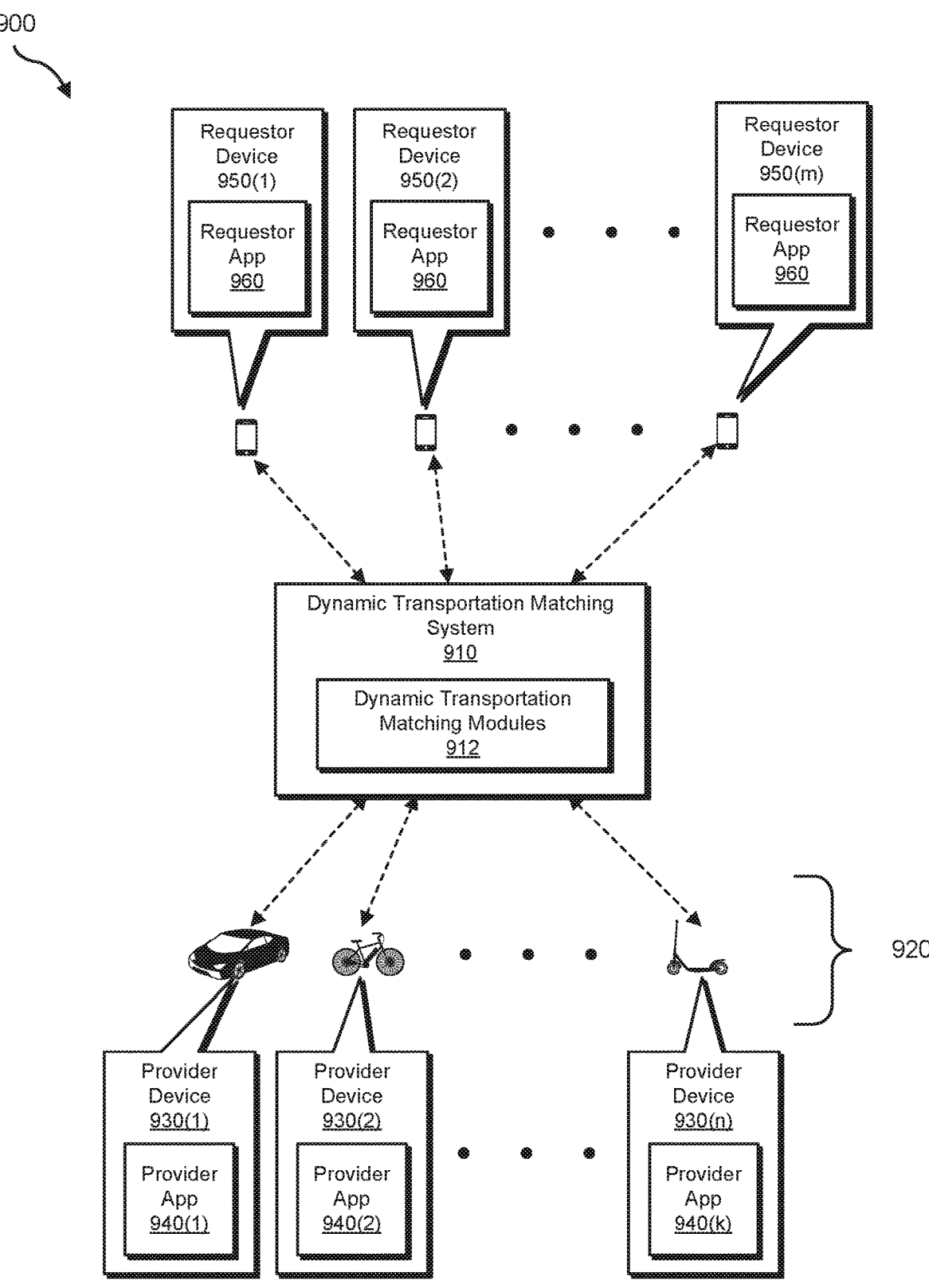
FIG. 9 is a block diagram of an example dynamic transportation management system.

FIG. 9 illustrates an example system 900 for matching transportation requests with a dynamic transportation network that includes rideable vehicles. As shown in FIG. 9, a dynamic transportation matching system 910 may be configured with one or more dynamic transportation matching modules 912 that may perform one or more of the steps described herein. Dynamic transportation matching system 910 may represent any computing system and/or set of computing systems capable of matching transportation requests. Dynamic transportation matching system 910 may be in communication with computing devices in each of a group of vehicles 920. Vehicles 920 may represent any vehicles that may fulfill transportation requests. In some examples, vehicles 920 may include disparate vehicle types and/or models. For example, vehicles 920 may include lane-bound vehicles and rideable vehicles. In some examples, some of vehicles 920 may be standard commercially available vehicles. According to some examples, some of vehicles 920 may be owned by separate individuals (e.g., transportation providers). Furthermore, while, in some examples, many or all of vehicles 920 may be human-operated, in some examples many of vehicles 920 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 9 does not specify the number of vehicles 920, it may be readily appreciated that the systems described herein are applicable to hundreds of vehicles, thousands of vehicles, or more. In one example, dynamic transportation matching system 910 may coordinate transportation matchings within a single region for 50,000 vehicles or more on a given day. In some examples, vehicles 920 may collectively form a dynamic transportation network that may provide transportation supply on an on-demand basis to transportation requestors.

As mentioned above, dynamic transportation matching system 910 may communicate with computing devices in each of vehicles 920. The computing devices may be any suitable type of computing device. In some examples, one or more of the computing devices may be integrated into the respective vehicles 920. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 910.

As shown in FIG. 9, vehicles 920 may include provider devices 930(1)-(n) (e.g., whether integrated into the vehicle, permanently affixed to the vehicle, temporarily affixed to the vehicle, worn by a driver of the vehicle, etc.). In some examples, provider devices 930 may include a provider apps 940(1)-(k). Provider apps 940(1)-(k) may represent any application, program, and/or module that may provide one or more services related to operating a vehicle and/or providing transportation matching services. For example, provider apps 940(1)-(k) may include a transportation matching application for providers and/or one or more applications for matching rideable vehicles with requestor devices. In some embodiments, different types of provider vehicles may be provisioned with different types of provider devices and/or different provider applications. For example, rideable vehicles may be provisioned with provider devices that are configured with a provider application that enables transportation requestors to reserve and/or operate the rideable vehicles while road-constrained and/or lane-bound vehicles (e.g., cars) may be provisioned with provider devices that are configured with a provider application that enables provider vehicle operators (e.g., transportation providers) to respond to requests from transportation requestors. In some examples, provider applications 940(1)-(k) may match the user of provider apps 940(1)-(k) (e.g., a transportation provider) with transportation requestors through communication with dynamic transportation matching system 910. In addition, and as is described in greater detail below, provider apps 940(1)-(k) may provide dynamic transportation management system 910 with information about a provider (including, e.g., the current location of the provider and/or vehicle) to enable dynamic transportation management system 910 to provide dynamic transportation matching and/or management services for the provider and one or more requestors. In some examples, provider apps 940(1)-(k) may coordinate communications and/or a payment between a requestor and a provider. According to some embodiments, provider apps 940(1)-(k) may provide a map service, a navigation service, a traffic notification service, and/or a geolocation service.

Additionally, as shown in FIG. 9, dynamic transportation matching system 910 may communicate with requestor devices 950(1)-(m). In some examples, requestor devices 950 may include a requestor app 960. Requestor app 960 may represent any application, program, and/or module that may provide one or more services related to requesting transportation matching services. For example, requestor app 960 may include a transportation matching application for requestors. In some examples, requestor app 960 may match the user of requestor app 960 (e.g., a transportation requestor) with transportation providers through communication with dynamic transportation matching system 910. In addition, and as is described in greater detail below, requestor app 960 may provide dynamic transportation management system 910 with information about a requestor (including, e.g., the current location of the requestor) to enable dynamic transportation management system 910 to provide dynamic transportation matching services for the requestor and one or more providers. In some examples, requestor app 960 may coordinate communications and/or a payment between a requestor and a provider. According to some embodiments, requestor app 960 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a networked transportation service, a ridesourcing service, a taxicab service, a carbooking service, an autonomous vehicle service, a personal mobility vehicle service, a rideable service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

While various examples provided herein relate to transportation, embodiments of the instant disclosure may include or be implemented in conjunction with a dynamic matching system applied to one or more services instead of and/or in addition to transportation services. For example, embodiments described herein may be used to match service providers with service requestors for any service.

FIG. 10 illustrates an example computer-implemented method 1000 for determining rideable vehicle locations. As shown in FIG. 10, at step 1010 one or more of the systems described herein may obtain, from a rideable vehicle, vehicle location data that identifies a location of the rideable vehicle. At step 1020, one or more of the systems described herein may identify that a mobile device that is associated with the rideable vehicle is within a proximate distance from the rideable vehicle. In some examples, the systems described herein may determine that the mobile device is within the proximate distance from the rideable vehicle by detecting an action that indicates that the mobile device is proximate to the rideable vehicle. In one example, the systems described herein may detect the action that indicates that the mobile device is within the proximate distance from the rideable vehicle by detecting reservation of the rideable vehicle to the mobile device and/or release of reservation of the rideable vehicle from the mobile device.

At step 1030, one or more of the systems described herein may obtain, in response to determining that the mobile device is within the proximate distance from the rideable vehicle, device location data that identifies a location of the mobile device. In some embodiments, the systems described herein may obtain, in response to detecting the end of ride of the rideable vehicle, first location data from a global positioning system sensor of the rideable vehicle and second location data from a wi-fi sensor of the rideable vehicle. In some examples, the systems described herein may then determine that the distance between a first location reported by the first location data and a second location reported by the second location data exceeds a threshold for distance between reported locations and, in response to determining that the distance between the first location and the second location exceeds the threshold for distance between reported locations, may obtain the device location data from the first mobile device.

At step 1040, one or more of the systems described herein may determine a refined location of the rideable vehicle based on the vehicle location data obtained from the rideable vehicle and the device location data obtained from the mobile device. At step 1050, one or more of the systems described herein may transmit the refined location of the rideable vehicle to a device.

In some examples, systems described herein may determine a level of location confidence for the refined location of the rideable vehicle based on at least one of a comparison between the vehicle location data obtained from the rideable vehicle and the device location data obtained from the mobile device, a comparison between the vehicle location data obtained from the rideable vehicle and additional device location data obtained from an additional device, and/or sensor data, obtained from the rideable vehicle, that indicates a percentage of functioning location sensors associated with the rideable vehicle. In one embodiment, systems described herein may identify a transportation request from a requestor device (e.g., that has requested transportation via the dynamic transportation matching system), determine that a level of location confidence in the refined location of the rideable vehicle is higher than a level of location confidence in a location of an additional rideable vehicle, match the transportation requestor device with the rideable vehicle instead of the additional rideable vehicle based on determining that the level of location confidence in the refined location of the rideable vehicle is higher than the level of location confidence in the location of the additional rideable vehicle, and transmit an indication of the match to the requestor device to cause the requestor device to display the indication with the refined location of the rideable vehicle. In one embodiment, systems described herein may send, to the requestor device, the refined location of the rideable vehicle for display on the requestor device.

In some examples, systems described herein may determine that the mobile device includes a device location sensor that is ranked higher on an ordered list of reliable location sensors than a vehicle location sensor included in the rideable vehicle, where determining the refined location of the rideable vehicle may include assigning a higher weight to the device location data obtained from the mobile device than to the vehicle location data obtained from the rideable vehicle. In one embodiment, systems described herein may determine that an additional rideable vehicle is within a proximate distance from the rideable vehicle and obtain additional vehicle location data from the additional rideable vehicle. In this embodiment, determining the refined location of the rideable vehicle may include determining the refined location based on both the vehicle location data obtained from the rideable vehicle and the additional vehicle location data obtained from the additional rideable vehicle that is within the proximate distance from the rideable vehicle. In one embodiment, systems described herein may determine, by comparing the vehicle location data obtained from the rideable vehicle to a map, that the vehicle location data indicates that the rideable vehicle is located at an implausible map location. In some examples, determining the refined location of the rideable vehicle may include determining that the rideable vehicle is not located at the implausible map location.

Figure 11:
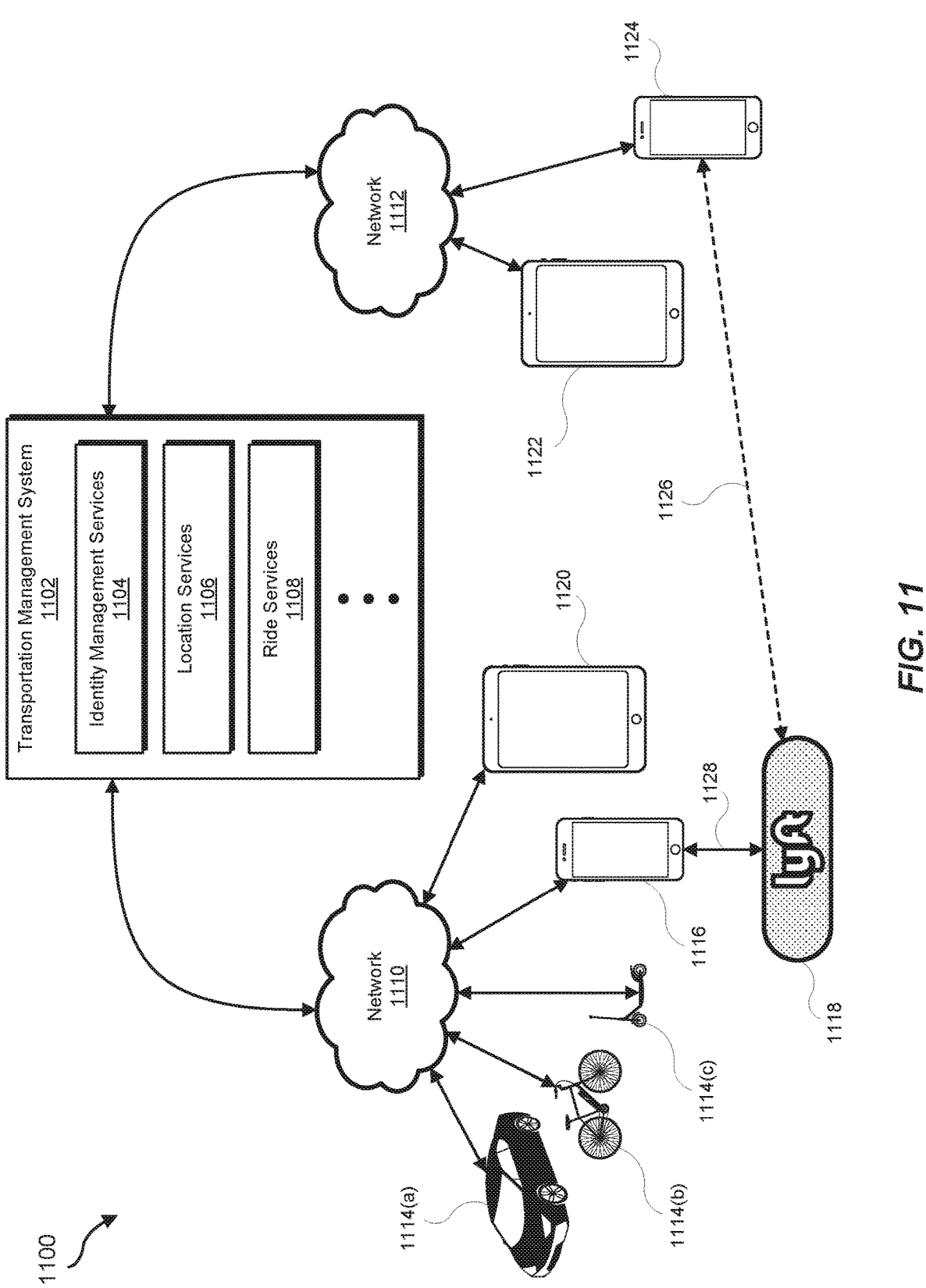
FIG. 11 is an illustration of an example requestor/provider management environment.

FIG. 11 shows a transportation management environment 1100, in accordance with various embodiments. As shown in FIG. 11, a transportation management system 1102 may run one or more services and/or software applications, including identity management services 1104, location services 1106, ride services 1108, and/or other services. Although FIG. 11 shows a certain number of services provided by transportation management system 1102, more or fewer services may be provided in various implementations. In addition, although FIG. 11 shows these services as being provided by transportation management system 1102, all or a portion of any of the services may be processed in a distributed fashion. For example, computations associated with a service task may be performed by a combination of transportation management system 1102 (including any number of servers, databases, etc.), one or more devices associated with a provider (e.g., devices integrated with managed vehicles 1114(*a*), 1114(*b*), and/or 1114(*c*); provider computing devices 1116 and tablets 1120; and transportation management vehicle devices 1118), and/or more or more devices associated with a ride requestor (e.g., the requestor's computing devices 1124 and tablets 1122). In some embodiments, transportation management system 1102 may include one or more general purpose computers, server computers, clustered computing systems, cloud-based computing systems, and/or any other computing systems or arrangements of computing systems. Transportation management system 1102 may be configured to run any or all of the services and/or software components described herein. In some embodiments, the transportation management system 1102 may include an appropriate operating system and/or various server applications, such as web servers capable of handling hypertext transport protocol (HTTP) requests, file transfer protocol (FTP) servers, database servers, etc.

In some embodiments, identity management services 1104 may be configured to perform authorization services for requestors and providers and/or manage their interactions and/or data with transportation management system 1102. This may include, e.g., authenticating the identity of providers and determining that they are authorized to provide services through transportation management system 1102. Similarly, requestors' identities may be authenticated to determine whether they are authorized to receive the requested services through transportation management system 1102. Identity management services 1104 may also manage and/or control access to provider and/or requestor data maintained by transportation management system 1102, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1102 may also manage and/or control access to provider and/or requestor data stored with and/or obtained from third-party systems. For example, a requester or provider may grant transportation management system 1102 access to a third-party email, calendar, or task management system (e.g., via the user's credentials). As another example, a requestor or provider may grant, through a mobile device (e.g., 1116, 1120, 1122, or 1124), a transportation application associated with transportation management system 1102 access to data provided by other applications installed on the mobile device. In some examples, such data may be processed on the client and/or uploaded to transportation management system 1102 for processing.

In some embodiments, transportation management system 1102 may provide ride services 1108, which may include ride matching and/or management services to connect a requestor to a provider. For example, after identity management services 1104 has authenticated the identity a ride requestor, ride services 1108 may attempt to match the requestor with one or more ride providers. In some embodiments, ride services 1108 may identify an appropriate provider using location data obtained from location services 1106. Ride services 1108 may use the location data to identify providers who are geographically close to the requestor (e.g., within a certain threshold distance or travel time) and/or who are otherwise a good match with the requestor. Ride services 1108 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services 1108 may use rule-based algorithms and/or machine-learning models for matching requestors and providers.

Transportation management system 1102 may communicatively connect to various devices through networks 1110 and/or 1112. Networks 1110 and 1112 may include any combination of interconnected networks configured to send and/or receive data communications using various communication protocols and transmission technologies. In some embodiments, networks 1110 and/or 1112 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1110 and/or 1112 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, Near Field Communication (NFC), Z-Wave, and ZigBee). In various embodiments, networks 1110 and/or 1112 may include any combination of networks described herein or any other type of network capable of facilitating communication across networks 1110 and/or 1112.

In some embodiments, transportation management vehicle device 1118 may include a provider communication device configured to communicate with users, such as drivers, passengers, pedestrians, and/or other users. In some embodiments, transportation management vehicle device 1118 may communicate directly with transportation management system 1102 or through another provider computing device, such as provider computing device 1116. In some embodiments, a requestor computing device (e.g., device 1124) may communicate via a connection 1126 directly with transportation management vehicle device 1118 via a communication channel and/or connection, such as a peer-to-peer connection, Bluetooth connection, NFC connection, ad hoc wireless network, and/or any other communication channel or connection. Although FIG. 11 shows particular devices communicating with transportation management system 1102 over networks 1110 and 1112, in various embodiments, transportation management system 1102 may expose an interface, such as an application programming interface (API) or service provider interface (SPI) to enable various third parties which may serve as an intermediary between end users and transportation management system 1102.

In some embodiments, devices within a vehicle may be interconnected. For example, any combination of the following may be communicatively connected: vehicle 1114, provider computing device 1116, provider tablet 1120, transportation management vehicle device 1118, requestor computing device 1124, requestor tablet 1122, and any other device (e.g., smart watch, smart tags, etc.). For example, transportation management vehicle device 1118 may be communicatively connected to provider computing device 1116 and/or requestor computing device 1124. Transportation management vehicle device 1118 may establish communicative connections, such as connections 1126 and 1128, to those devices via any suitable communication technology, including, e.g., WLAN technologies implementing the IEEE 902.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1102 using applications executing on their respective computing devices (e.g., 1116, 1118, 1120, and/or a computing device integrated within vehicle 1114), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1114 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1102. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 12:
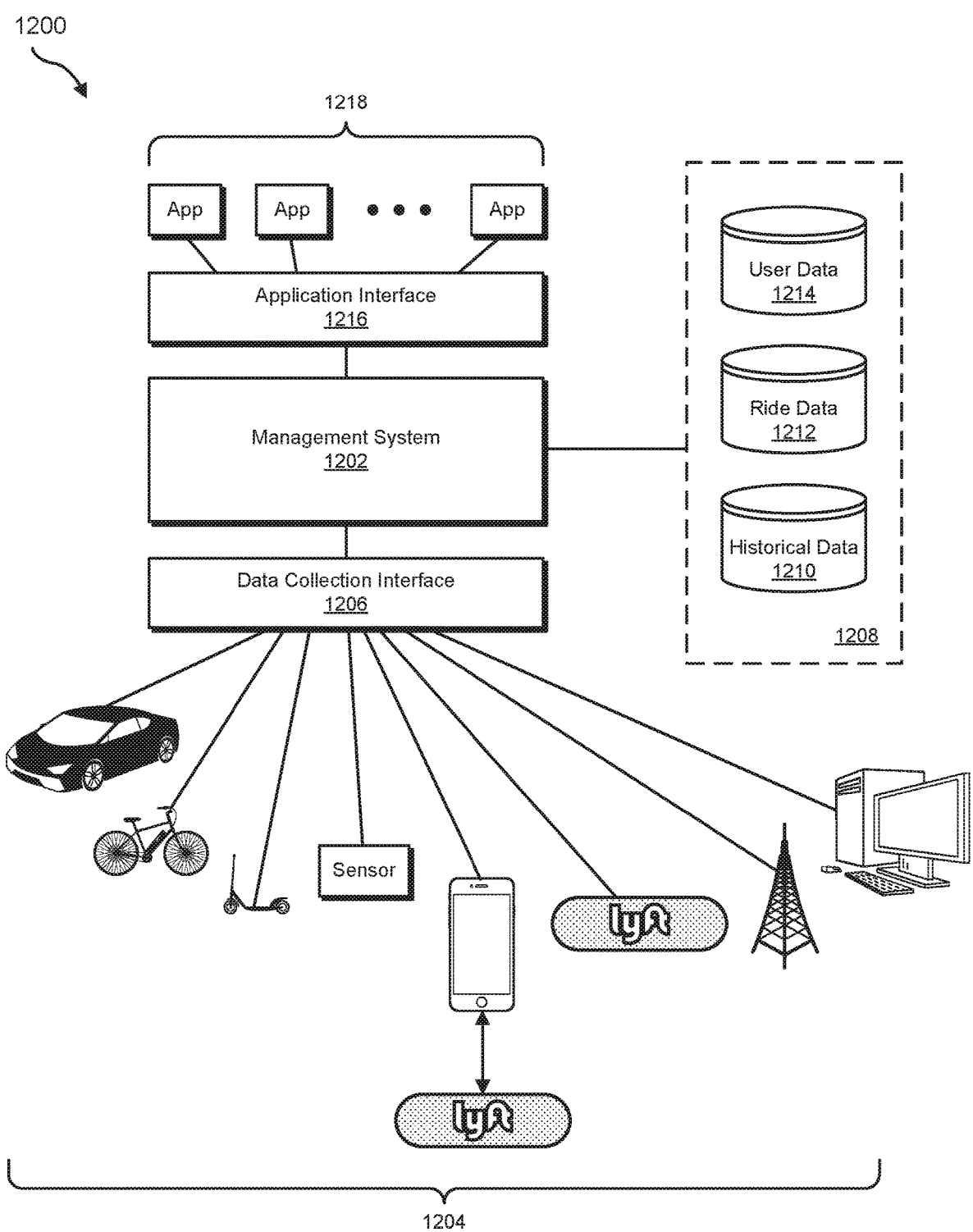
FIG. 12 is an illustration of an example data collection and application management system.

FIG. 12 shows a data collection and application management environment 1200, in accordance with various embodiments. As shown in FIG. 12, management system 1202 may be configured to collect data from various data collection devices 1204 through a data collection interface 1206. As discussed above, management system 1202 may include one or more computers and/or servers or any combination thereof. Data collection devices 1204 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1206 can include, e.g., an extensible device framework configured to support interfaces for each data collection device. In various embodiments, data collection interface 1206 may be extended to support new data collection devices as they are released and/or to update existing interfaces to support changes to existing data collection devices. In various embodiments, data collection devices may communicate with data collection interface 1206 over one or more networks. The networks may include any network or communication protocol as would be recognized by one of ordinary skill in the art, including those networks discussed above.

As shown in FIG. 12, data received from data collection devices 1204 can be stored in data 1208. Data 1208 may include one or more data stores, such as databases, object storage systems and services, cloud-based storage services, and other data stores. For example, various data stores may be implemented on a non-transitory storage medium accessible to management system 1202, such as historical data 1210, ride data 1212, and user data 1214. Data stores 1208 can be local to management system 1202, or remote and accessible over a network, such as those networks discussed above or a storage-area network or other networked storage system. In various embodiments, historical data 1210 may include historical traffic data, weather data, request data, road condition data, or any other data for a given region or regions received from various data collection devices. Ride data 1212 may include route data, request data, timing data, and other ride related data, in aggregate and/or by requestor or provider. User data 1214 may include user account data, preferences, location history, and other user-specific data. Although certain data stores are shown by way of example, any data collected and/or stored according to the various embodiments described herein may be stored in data stores 1208.

As shown in FIG. 12, an application interface 1216 can be provided by management system 1202 to enable various apps 1218 to access data and/or services available through management system 1202. Apps 1218 may run on various user devices (including provider and requestor computing devices, such as those discussed above) and/or may include cloud-based or other distributed apps configured to run across various devices (e.g., computers, servers, or combinations thereof). Apps 1218 may include, e.g., aggregation and/or reporting apps which may utilize data 1208 to provide various services (e.g., third-party ride request and management apps). In various embodiments, application interface 1216 can include an API and/or SPI enabling third party development of apps 1218. In some embodiments, application interface 1216 may include a web interface, enabling web-based access to data 1208 and/or services provided by management system 1202. In various embodiments, apps 1218 may run on devices configured to communicate with application interface 1216 over one or more networks. The networks may include any network or communication protocol as would be recognized by one of ordinary skill in the art, including those networks discussed above, in accordance with an embodiment of the present disclosure.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally or alternatively, without limitation to transportation services, a matching system for any service may facilitate the fulfillment of requests using both human drivers and autonomous vehicles.

As detailed above, the computing devices and systems described and/or illustrated herein broadly represent any type or form of computing device or system capable of executing computer-readable instructions, such as those contained within the modules described herein. In some examples, the term "operations" may generally refer to any computing instruction or set of computing instructions initiated and/or carried out by a software and/or hardware component of a device. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory. In some embodiments, the term "non-transitory memory" may refer to any form of non-volatile storage medium.

In some examples, the terms "physical processor" and/or "hardware processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed:

1. A dynamic matching system, comprising:

a non-transitory hardware memory; and one or more hardware processors configured to execute instructions from the non-transitory hardware memory to perform operations comprising:

receiving a relocation confirmation message from a mobile device associated with an operator tasked with relocating one or more of a plurality of rideable vehicles, wherein the relocation confirmation message indicates that a drop-off of the one or more of the plurality of rideable vehicles at an accessible location is completed;

determining, based on the relocation confirmation message, that the plurality of rideable vehicles are within a proximate distance from each other;

identifying a difference between a first location data generated based on a global positioning system (GPS) sensor associated with the first rideable vehicle and a second location data generated based on a Wi-Fi sensor associated with the first rideable vehicle;

determining that the first location data or the second location data identifying a location of the first rideable vehicle is insufficiently reliable based on a determination that the identified difference between the first location data and the second location data is greater than a pre-determined value;

obtaining, in response to determining that the first location data or the second location data identifying a location of the first rideable vehicle is insufficiently reliable, from one or more second rideable vehicles among the plurality of rideable vehicles, third location data that identifies locations of the one or more second rideable vehicles; and determining a refined location of the first rideable vehicle based on the first location data, the second location data, and the third location data.

2. The dynamic matching system of claim 1, wherein the operations further comprise:

sending, to the operator device, in response to receiving the relocation confirmation message, a request for an operator location data that identifies a location of the operator device; and receiving, from the operator device, the operator location data, wherein determining the refined location of the first rideable vehicle is further based on the operator location data.

3. The dynamic matching system of claim 1, wherein determining the refined location of the first rideable vehicle comprises triangulating the refined location of the first rideable vehicle based on the identified locations of the one or more second rideable vehicles.

4. The dynamic matching system of claim 1, wherein determining the refined location of the first rideable vehicle comprises averaging the location of the first rideable vehicle and the locations of the one or more second rideable vehicles.

5. The dynamic matching system of claim 1, wherein determining the refined location of the first rideable vehicle comprises:

retrieving historical location accuracy data for the first rideable vehicle and the one or more second rideable vehicles;

identifying a rideable vehicle with a highest historical location accuracy among the first rideable vehicle and the one or more second rideable vehicles; and determining the refined location of the first rideable vehicle based on a location of the rideable vehicle with the highest historical location accuracy.

6. The dynamic matching system of claim 1, wherein determining the refined location of the first rideable vehicle is performed in response to determining that the first location data or the second location data identifying the location of the first rideable vehicle is insufficiently reliable.

7. The dynamic matching system of claim 1, wherein the operations further comprise:

receiving, from a mobile device, a request for a reservation of a rideable vehicle; and transmitting, to the mobile device, the refined location of the first rideable vehicle for display.

8. The dynamic matching system of claim 7, wherein transmitting, to the mobile device, the refined location of the first rideable vehicle for display further comprises:

identifying the request from the mobile device;

determining that the first rideable vehicle and an additional rideable vehicle are candidates for matching with the mobile device;

determining that a level of location confidence in the refined location of the first rideable vehicle is higher than a level of location confidence in a location of the additional rideable vehicle;

matching the mobile device with the first rideable vehicle instead of the additional rideable vehicle based on the determination that the level of location confidence in the refined location of first the rideable vehicle is higher than the level of location confidence in the location of the additional rideable vehicle; and transmitting an indication of the match to the mobile device to cause the mobile device to display the indication with the refined location of the first rideable vehicle.

9. The dynamic matching system of claim 1, wherein the relocation confirmation message includes identifying information for the plurality of rideable vehicles.

10. A method, comprising, by a dynamic matching system:

receiving a relocation confirmation message from a mobile device associated with an operator tasked with relocating one or more of a plurality of rideable vehicles, wherein the relocation confirmation message indicates that a drop-off of the one or more of the plurality of rideable vehicles at an accessible location is completed;

determining, based on the relocation confirmation message, that the plurality of rideable vehicles are within a proximate distance from each other;

identifying a difference between a first location data generated based on a global positioning system (GPS) sensor associated with the first rideable vehicle and a second location data generated based on a Wi-Fi sensor associated with the first rideable vehicle;

determining that the first location data or the second location data identifying a location of the first rideable vehicle is insufficiently reliable based on a determination that the identified difference between the first location data and the second location data is greater than a pre- determined value;

obtaining, in response to determining that the first location data or the second location data identifying a location of the first rideable vehicle is insufficiently reliable, from one or more second rideable vehicles among the plurality of rideable vehicles, third location data that identifies locations of the one or more second rideable vehicles; and determining a refined location of the first rideable vehicle based on the first location data, the second location data, and the third location data.

11. The method of claim 10, further comprising:

sending, to the operator device, in response to receiving the relocation confirmation message, a request for an operator location data that identifies a location of the operator device; and receiving, from the operator device, the operator location data, wherein determining the refined location of the first rideable vehicle is further based on the operator location data.

12. The method of claim 10, wherein determining the refined location of the first rideable vehicle comprises triangulating the refined location of the first rideable vehicle based on the identified locations of the one or more second rideable vehicles.

13. The method of claim 10, wherein determining the refined location of the first rideable vehicle comprises averaging the location of the first rideable vehicle and the locations of the one or more second rideable vehicles.

14. The method of claim 10, wherein determining the refined location of the first rideable vehicle comprises:

retrieving historical location accuracy data for the first rideable vehicle and the one or more second rideable vehicles;

identifying a rideable vehicle with a highest historical location accuracy among the first rideable vehicle and the one or more second rideable vehicles; and determining the refined location of the first rideable vehicle based on a location of the rideable vehicle with the highest historical location accuracy.

15. A non-transitory machine-readable medium having stored thereon machine-readable instructions executable to cause a dynamic matching system to perform operations comprising:

receiving a relocation confirmation message from a
    mobile device associated with an operator tasked with
    relocating one or more of a plurality of rideable
    vehicles, wherein the relocation confirmation message
    indicates that a drop-off of the one or more of the
    plurality of rideable vehicles at an accessible location is
    completed;
determining, based on the relocation confirmation mes-
    sage, that the plurality of rideable vehicles are within a
    proximate distance from each other;
identifying a difference between a first location data
    generated based on a global positioning system (GPS)
    sensor associated with the first rideable vehicle and a
    second location data generated based on a Wi-Fi sensor
    associated with the first rideable vehicle;
determining that the first location data or the second
    location data identifying a location of the first rideable
    vehicle is insufficiently reliable based on a determina-
    tion that the identified difference between the first
    location data and the second location data is greater
    than a pre-determined value;
obtaining, in response to determining that the first loca-
    tion data or the second location data identifying a
    location of the first rideable vehicle is insufficiently
    reliable, from one or more second rideable vehicles
    among the plurality of rideable vehicles, third location
    data that identifies locations of the one or more second
    rideable vehicles; and
determining a refined location of the first rideable vehicle
    based on the first location data, the second location
    data, and the third location data.

16. The non-transitory machine-readable medium of
claim 15, wherein the operations further comprise:

sending, to the operator device, in response to receiving
    the relocation confirmation message, a request for an
    operator location data that identifies a location of the
    operator device; and
receiving, from the operator device, the operator location
    data, wherein determining the refined location of the
    first rideable vehicle is further based on the operator
    location data.

17. The non-transitory machine-readable medium of
claim 15, wherein determining the refined location of the
first rideable vehicle comprises triangulating the refined
location of the first rideable vehicle based on the identified
locations of the one or more second rideable vehicles.

18. The non-transitory machine-readable medium of
claim 15, wherein determining the refined location of the
first rideable vehicle comprises averaging the location of the
first rideable vehicle and the locations of the one or more
second rideable vehicles.

19. The non-transitory machine-readable medium of
claim 15, wherein determining the refined location of the
first rideable vehicle comprises:

retrieving historical location accuracy data for the first
    rideable vehicle and the one or more second rideable
    vehicles;
identifying a rideable vehicle with a highest historical
    location accuracy among the first rideable vehicle and
    the one or more second rideable vehicles; and
determining the refined location of the first rideable
    vehicle based on a location of the rideable vehicle with
    the highest historical location accuracy.

* * * * *